(12) United States Patent
Gottlieb et al.

(10) Patent No.: US 9,114,331 B2
(45) Date of Patent: Aug. 25, 2015

(54) APPARATUS AND METHOD FOR DEGASSING LIQUIDS

(71) Applicants: Amos J Gottlieb, San Francisco, CA (US); David L Crain, Tiburon, CA (US)

(72) Inventors: Amos J Gottlieb, San Francisco, CA (US); David L Crain, Tiburon, CA (US)

(73) Assignee: RANDOM TECHNOLOGIES LLC, San Francisco, CA (US)

( * ) Notice: Subject to any disclaimer, the term of this patent is extended or adjusted under 35 U.S.C. 154(b) by 97 days.

(21) Appl. No.: 13/781,603

(22) Filed: Feb. 28, 2013

(65) Prior Publication Data

US 2014/0090557 A1    Apr. 3, 2014

Related U.S. Application Data

(60) Provisional application No. 61/707,545, filed on Sep. 28, 2012.

(51) Int. Cl.
*B01D 19/00* (2006.01)
*F15D 1/00* (2006.01)

(52) U.S. Cl.
CPC ........ *B01D 19/0042* (2013.01); *B01D 19/0031* (2013.01); *F15D 1/00* (2013.01); *Y10T 137/85938* (2015.04)

(58) Field of Classification Search
CPC .............. B01D 53/22; B01D 19/0031; B01D 19/0042; F15D 1/00
USPC ..................... 96/6, 7, 9, 11; 95/46; 137/561 A
See application file for complete search history.

(56) References Cited

U.S. PATENT DOCUMENTS

| 3,591,493 A | 7/1971 | Zeneih |
| 3,751,879 A | 8/1973 | Allington |
| 4,422,936 A | 12/1983 | Riede |

(Continued)

FOREIGN PATENT DOCUMENTS

| DE | 3708950 | 9/1988 |
| DE | 3923530 | 1/1990 |

(Continued)

OTHER PUBLICATIONS

International search report and Written Opinion for PCT/US 2013/061780.

*Primary Examiner* — Jason M Greene

(57) ABSTRACT

A planar degasser comprises (1) a flow plate comprising a flow channel, (2) a planar separation membrane comprising a membrane transmission section which has a first major surface and a second major surface, the flow channel being at least in part bounded by the first major surface of the membrane transmission section, (3) a supporting member which supports the second major surface of the membrane transmission section when the pressure on the first major surface is greater than the pressure on the second major surface, and (4) structural features which enable liquid to flow through the flow channel when the pressure on the first major surface is equal to or less than the pressure on the second major surface, for example when there is no longer a vacuum on the second major surface of the membrane transmission section. The structural features can for example be an open channel in the base of the flow plate, or upstanding features on the base of the flow plate, or a passageway which is closed when the vacuum is on, but open when the vacuum is off, for example a passageway having a valve which is controlled by the vacuum.

17 Claims, 2 Drawing Sheets

(56) References Cited

U.S. PATENT DOCUMENTS

| | | | |
|---|---|---|---|
| 4,461,165 A | 7/1984 | Kesson | |
| 5,019,140 A | 5/1991 | Bowser | |
| 5,154,832 A | 10/1992 | Yamamura | |
| 5,183,486 A | 2/1993 | Gatten | |
| 5,340,384 A | 8/1994 | Sins | |
| 5,693,122 A | 12/1997 | Berndt | |
| 5,749,942 A | 5/1998 | Mattis | |
| 5,827,429 A * | 10/1998 | Ruschke et al. | 96/6 |
| 5,876,604 A | 3/1999 | Nemser | |
| 5,888,275 A | 3/1999 | Hamasaki | |
| 5,980,742 A | 11/1999 | Saitoh | |
| 6,126,723 A | 10/2000 | Drost | |
| 6,241,945 B1 | 6/2001 | Owen | |
| 6,248,157 B1 | 6/2001 | Sims et al. | |
| 6,258,154 B1 | 7/2001 | Berndt et al. | |
| 6,309,444 B1 | 10/2001 | Sims et al. | |
| 6,315,815 B1 | 11/2001 | Spadaccini et al. | |
| 6,494,938 B2 | 12/2002 | Sims et al. | |
| 6,596,058 B2 | 7/2003 | Gerner et al. | |
| 6,709,492 B1 | 3/2004 | Spadaccini et al. | |
| 6,949,132 B2 | 9/2005 | Thielen et al. | |
| 6,989,002 B2 * | 1/2006 | Guala | 604/126 |
| 7,022,157 B2 | 4/2006 | Tsai | |
| 7,140,495 B2 * | 11/2006 | Hester et al. | 96/6 |
| 7,144,443 B2 | 12/2006 | Gerner et al. | |
| 7,329,305 B2 | 2/2008 | Sloan | |
| 7,393,388 B2 | 7/2008 | Spadaccini et al. | |
| 7,399,345 B2 | 7/2008 | Gerner | |
| 7,427,312 B2 | 9/2008 | Gerner et al. | |
| 7,435,284 B2 | 10/2008 | Piccinini et al. | |
| 7,465,335 B2 | 12/2008 | Schmidt | |
| 7,465,336 B2 | 12/2008 | McHugh | |
| 7,686,590 B2 | 3/2010 | Ishii et al. | |
| 6,016,397 A1 | 9/2011 | Ro et al. | |
| 2005/0079074 A1 | 4/2005 | Ishii et al. | |
| 2005/0098032 A1 | 5/2005 | Tsai | |
| 2007/0095204 A1 | 5/2007 | Gerner et al. | |
| 2007/0107454 A1 * | 5/2007 | Gonjo et al. | 62/304 |
| 2010/0294128 A1 * | 11/2010 | Schmidt et al. | 95/46 |
| 2012/0160096 A1 | 6/2012 | Gottlieb et al. | |

FOREIGN PATENT DOCUMENTS

| | | | | |
|---|---|---|---|---|
| DE | 199 41 271 A1 * | 4/2001 | | B01D 19/0031 |
| DE | 19941271 | 4/2001 | | |
| EP | 0973031 | 7/1998 | | |
| EP | 1529560 | 3/2004 | | |
| EP | 157-9901 | 9/2005 | | |
| WO | WO 2011/031333 A1 * | 3/2011 | | B01D 19/00 |

* cited by examiner

APPARATUS AND METHOD FOR DEGASSING LIQUIDS

CROSS-REFERENCE TO RELATED APPLICATIONS

This invention claims priority from, and the benefit of, U.S. provisional application 61/707,545, filed Sep. 28, 2012. The entire disclosure of that provisional application is incorporated herein by reference for all purposes.

FIELD OF THE INVENTION

This invention relates to methods and apparatus for changing the concentration of one or more gases in a liquid.

In some applications, a liquid is "degassed" in order to reduce the concentration of dissolved gases and/or gas bubbles in the liquid. In this specification, the term "degassing" is used to include both the removal of dissolved gases and the removal of gas bubbles (which is sometimes referred to in the art as "debubbling"). The liquid can for example be an HPLC eluent, an analytical sample or aircraft fuel. These applications make use of a "separation membrane", this term being used in this specification to denote a membrane which is substantially impermeable to at least one liquid and through which a gas which is dissolved in the liquid and is to be removed from the liquid, or a gas which is to be added to the liquid, can pass when the partial pressure of the gas on one side of the membrane is greater than the partial pressure of the gas on the other side of the membrane. For example, the membrane may be substantially impermeable to one or more of water, methyl alcohol, acetonitrile, n-hexane, ink jet fluid, jet fuel or other liquid fuel, but permeable to one or both of oxygen and nitrogen.

There are tubular degassers and planar degassers. Reference may be made, for example, to U.S. Pat. No. 3,735,562, U.S. Pat. No. 3,591,493, U.S. Pat. No. 3,751,879, U.S. Pat. No. 4,325,750 U.S. Pat. No. 4,469,496, U.S. Pat. No. 5,183,486, U.S. Pat. No. 5,340,384, U.S. Pat. No. 5,693,122, U.S. Pat. No. 5,749,942, U.S. Pat. No. 5,980,742, U.S. Pat. No. 5,876,604, U.S. Pat. No. 5,980,742, U.S. Pat. No. 6,248,157, U.S. Pat. No. 6,258,154, U.S. Pat. No. 6,309,444, U.S. Pat. No. 6,315,815, U.S. Pat. No. 6,494,938, U.S. Pat. No. 6,596,058, U.S. Pat. No. 6,709,492, U.S. Pat. No. 6,949,132, U.S. Pat. No. 7,022,157, U.S. Pat. No. 7,399,345, U.S. Pat. No. 7,427,312, U.S. Pat. No. 7,686,590, EP 0973031 and International Publication WO 2011/031333. The entire disclosure of each of those patents and publications is incorporated herein by reference for all purposes.

In many planar degassers, a planar separation membrane has a first major surface which provides at least part of one wall of a planar flow channel, and the liquid to be degassed passes through the flow channel. The pressure on the opposite major surface of the membrane (often referred to simply as a vacuum) is less than the pressure in the flow channel. There is a supporting member which supports the opposite major surface of membrane. The function of the supporting member is to support the membrane while permitting gas which passes through the separation member to go to an outlet. The vacuum maintains or helps to maintain the separation membrane in contact with the supporting member. The supporting member can for example be a porous member or a plate having multiple protrusions which contact the separation membrane but which are separated from each other so that gas can pass between the protrusions to the outlet.

In other uses of planar degassers (which might perhaps more accurately be described as devices for adding gas to liquids) a gas is adding to a liquid by passing a gas through the supporting member and the separation membrane, and into a liquid which is passing through the flow channel.

SUMMARY OF THE INVENTION

In some uses of planar degassers making use of a vacuum above the separation member, it is desirable for a liquid to flow through the flow channel when the vacuum is turned off and degassing is not taking place. This can occur, for example, when changing from one solvent to another in an HPLC system. It has been discovered however, that when the vacuum is turned off, the membrane can separate from the supporting member and contact the bottom of the flow channel, thus preventing liquid from flowing through the flow channel. The smaller the height of the flow channel, the more likely it is that this problem will occur. The present invention provides a solution to this problem by modifying a planar degasser so that liquid can flow through the flow channel both under vacuum and when the vacuum is turned off.

In a first aspect, this invention provides a planar degasser comprising
 (1) a flow plate which comprises a flow plate chamber having a base, an inlet and an outlet,
 (2) a planar separation membrane comprising a membrane transmission section which has a first major surface and a second major surface, the first major surface of the membrane transmission section being adjacent to the base of the flow plate chamber and
 (3) a supporting member which is adjacent to the second major surface of the membrane transmission section;
the separation membrane
 (A) when the pressure on the first major surface is greater than the pressure on the second major surface, (1) contacting and being supported by the supporting member and (2) forming, with the base of the flow plate chamber, a flow channel through which a liquid to be degassed can be passed from the inlet of the flow plate chamber to the outlet of the flow plate chamber; and
 (B) when the pressure on the first major surface is less than the pressure on the second major surface (1), being separate from the supporting member and
 (2) contacting the base of the flow plate chamber;
the degasser comprising structural features which enable liquid to flow from the inlet of the flow plate chamber to the outlet of the flow plate chamber when the pressure on the first major surface of the separation membrane is less than the pressure on the second major surface of the membrane, and when, therefore, the separation membrane is separate from the supporting member and contacts the base of the flow plate chamber.

In a first embodiment of the invention, the base of the flow plate chamber comprises an open channel which connects the inlet of the flow plate chamber to the outlet of the flow plate chamber and which enables liquid to flow from the inlet of the flow plate chamber to the outlet of the flow plate chamber when the separation membrane is separate from the supporting member and contacts the base of the flow plate chamber.

In a second embodiment of the invention, the base of the flow plate chamber comprises upstanding elements which prevent the membrane from contacting the whole surface of the base of the flow plate chamber, thus enabling liquid to flow from the inlet of the flow plate chamber to the outlet of the flow plate chamber when the separation membrane is separate from the supporting member and contacts the base of the flow plate chamber.

In a third embodiment of the invention, the degasser comprises (1) a passageway which connects the inlet of the flow plate chamber to the outlet of the flow plate chamber and (2) a valve which (a) is controlled by the pressure on the separation membrane and (b) closes the passageway when the pressure on the first major surface of the separation membrane is greater than the pressure on the second major surface and opens the passageway when the pressure on the first major surface of the separation membrane is less than the pressure on the second major surface, thus enabling a liquid to flow from the inlet of the flow plate chamber to the outlet of the flow plate chamber.

In some embodiments of the invention, the supporting member is a selection plate comprising an inner selection plate surface which comprises (i) a selection plate base, and (ii) selection plate elements which extend from the base, are separated by intercommunicating selection areas, and have outer surfaces remote from the selection plate base.

In other embodiments of the invention, the supporting member is a porous material which is sufficiently rigid to support the planar membrane. The supporting member can for example comprise (i) a rigid porous polymeric material and/or a porous metal sheet. Suitable polymeric materials are available from Porex Corporation, Fairburn, Ga., USA. Suitable porous metal sheet can be made by sintering, and is for example available from the Matt Corporation, 84 Spring Lane, Farmington, Conn. 06032, USA.

Depending on the exact details of the degassing apparatus, in particular the dimensions of the flow channel and the number of outlets from the flow channel, different structural features can be enable liquid to flow through the flow channel when no vacuum is exerted on the membrane. Different embodiments of the invention are described above and below. Optionally two or more of these embodiments can be used in combination.

In one preferred embodiment the flow channel comprises an inlet, an outlet, and a base which comprises an open channel which runs from the inlet to the outlet. Surprisingly, it has been found that when there are multiple outlets, and particularly when the height of the flow channel is small, a channel which runs from the inlet to only one of the outlets may not solve the problem and permit the degassing apparatus to operate effectively without a vacuum. Preferably, therefore, when there are two or more outlets, the passageway connects the inlet to at least two of, preferably each of, the outlets. For example, the passageway runs from the inlet to one of the outlets and then continues to connect all the outlets. In some embodiments, the passageway runs in a pattern similar to an "L" or a "7".

In another embodiment, the base of the flow channel comprises upstanding features which prevent the membrane from contacting the whole surface of the flow plate chamber, thus permitting fluid to flow from the inlet to the outlet even when the vacuum is off.

In another embodiment, the separation membrane is placed under tension so that it does not to contact the flow plate chamber when the vacuum is off.

In another embodiment, the apparatus includes a passageway which is closed when the vacuum is on, but open when the vacuum is off, for example a passageway having a valve which is controlled by the vacuum. This embodiment has the advantage that it does not in any way compromise the degassing efficiency of the apparatus.

In a second aspect, this invention provides a method comprising the steps of
(1) passing a first liquid to be degassed through a planar degasser according to the first aspect of the invention while the pressure on the first major surface is greater than the pressure on the second major surface,
(2) after step (1, reducing the pressure on the first major surface so that it is equal to or less than the pressure on the second major surface, and passing a second liquid through the open channel in the base of the flow plate chamber.

Preferably the method includes a further step (3), after step (2), in which the pressure on the first major surface is increased so that it is greater than the pressure on the second major surface, and a liquid to be degassed, which may for example be the second liquid or a third liquid, is passed through the planar degasser.

In a third aspect, this invention provides a flow plate which is suitable for use in a planar degasser according to the first aspect of the invention and which comprises an inlet and at least one outlet, and structural features which enable liquid to flow from the inlet to the outlet or outlets when the flow plate is incorporated in a planar degasser according to the first aspect of the invention when the pressure on the first major surface is equal to or less than the pressure on the second major surface.

In a fourth aspect, this invention provides a method comprising the steps of
(1) attaching a syringe to a (priming) valve on an HPLC pump that is located immediately upstream from the pump's input check valves,
(2) opening the valve on an HPLC pump that is located immediately upstream from the input check valves,
(3) drawing fluid from a reservoir, through the connecting tubing leading to a planar degasser according to the first aspect of the invention, through the planar degasser, through tubing leading from the plane degasser to the pump, and into the syringe,
(4) applying power to the HPLC pump which also energizes a vacuum source attached to a planar degasser, and
(5) initiating the pump's pumping action.

BRIEF DESCRIPTION OF THE DRAWINGS

The invention is illustrated in the accompanying drawings, which are diagrammatic in nature and are not to scale, and in which.

DETAILED DESCRIPTION OF THE INVENTION

Figure 1:
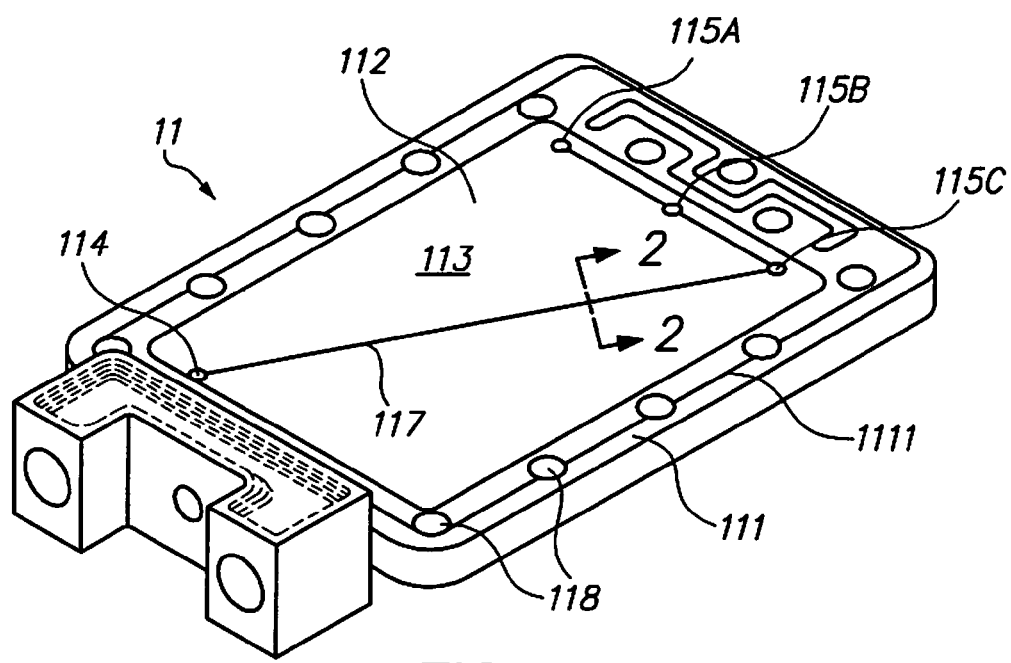
FIG. 1 is a perspective view of a flow plate suitable for use in the invention.

In the Summary of the Invention above, the Detailed Description of the Invention below, and the accompanying drawings, reference is made to particular features (including for example components, ingredients, elements, devices, apparatus, systems, groups, ranges, method steps, test results, etc.) of the invention. It is to be understood that the disclosure of the invention in this specification includes all possible combinations of such particular features. For example, where a particular feature is disclosed in the context of a particular aspect, a particular embodiment, a particular claim, or a particular Figure, that feature can also be used, to the extent appropriate, in the context of other particular aspects, embodiments, claims and Figures, and in the invention generally. The invention disclosed and claimed in this specification includes embodiments not specifically described herein and can for example make use of features which are not specifically described herein, but which provide functions which are the same, equivalent or similar to, features specifically disclosed herein.

The term "comprises" and grammatical equivalents thereof are used herein to mean that, in addition to the features specifically identified, other features are optionally present. For example, an apparatus "comprising" (or "which comprises") elements A, B and C can contain only elements A, B and C, or can contain not only elements A, B and C but also one or more other elements. The term "consisting essentially of" and grammatical equivalents thereof is used herein to mean that, in addition to the features specifically identified, other features may be present which do not materially alter the claimed invention. The term "at least" followed by a number is used herein to denote the start of a range beginning with that number (which may be a range having an upper limit or no upper limit, depending on the variable being defined). For example "at least 1" means 1 or more than 1, and "at least 80%" means 80% or more than 80%. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number)–(a second number)", this means a range whose lower limit is the first number and whose upper limit is the second number. For example, "from 8 to 20 inches" or "8-20 inches" means a range whose lower limit is 8 inches, and whose upper limit is 20 inches. The terms "plural", "multiple", "plurality" and "multiplicity" are used herein to denote two or more than two features.

Where reference is made herein to a method comprising two or more defined steps, the defined steps can be carried out in any order or simultaneously (except where the context excludes that possibility), and the method can optionally include one or more other steps which are carried out before any of the defined steps, between two of the defined steps, or after all the defined steps (except where the context excludes that possibility). Where reference is made herein to "a" or "an" feature, this includes the possibility that there are two or more such features (except where the context excludes that possibility). Where reference is made herein to two or more features, this includes the possibility that the two or more features are replaced by a lesser number or greater number of features providing the same function (except where the context excludes that possibility). The numbers given herein should be construed with the latitude appropriate to their context and expression; for example, each number is subject to variation which depends on the accuracy with which it can be measured by methods conventionally used by those skilled in the art.

In this specification, parts and percentages are by weight, except where otherwise noted. Temperatures are in degrees Centigrade (° C.).

This specification incorporates by reference all documents referred to herein and all documents filed concurrently with this specification or filed previously in connection with this application, including but not limited to such documents which are open to public inspection with this specification.

In one embodiment, the apparatus of the invention comprises (1) a flow plate which comprises (a) a flow plate chamber,
    (b) an inner flow plate surface, and (c) a flow plate peripheral member which (i) surrounds the flow plate chamber, and (ii) extends away from the inner flow plate surface
(2) a selection plate comprising
    (a) an inner selection plate surface which comprises (i) a selection plate base and (ii) selection plate elements which extend from the base, are separated by intercommunicating selection areas, and have outer surfaces remote from the selection plate base, and
    (b) a selection plate peripheral member which surrounds the inner selection plate surface and extends away from the selection plate base;
(3) a planar separation membrane which (a) comprises (i) a membrane transmission section having a first major surface and a second major surface, and (ii) a membrane peripheral member which surrounds the membrane transmission section, and (b) lies between the flow plate and the selection plate;
(4) a flow channel which (a) comprises the flow plate chamber, and (b) is at least in part bounded by the first major surface of the membrane transmission section, the flow plate peripheral member and the inner flow plate surface;
(5) an inlet for liquid to enter the flow channel;
(6) an outlet for liquid to leave the flow channel;
(7) a selection channel which is at least in part bounded by the second major surface of the membrane transmission section, the selection plate base, and the selection plate elements; and
(8) at least one selection plate port for maintaining a selection fluid in the selection channel;

the flow plate peripheral member and the selection plate peripheral member being sealed to each other;

the apparatus comprising structural features which enable liquid to flow through the flow channel when no vacuum is exerted on the membrane.

In this apparatus, the selection plate can be replaced by a rigid porous member.

The seal between the flow plate peripheral member and the selection plate peripheral member can for example be accomplished by sandwiching the membrane peripheral member between the flow plate peripheral member and the selection plate peripheral member so that it directly contacts each of the flow plate peripheral member and the selection plate peripheral member, or in some other way, for example making use of a seal comprising an O-ring.

In a first example of this embodiment, there is a single flow plate, a single selection plate, a single planar membrane, a single flow channel, and a single selection channel.

Figure 2:
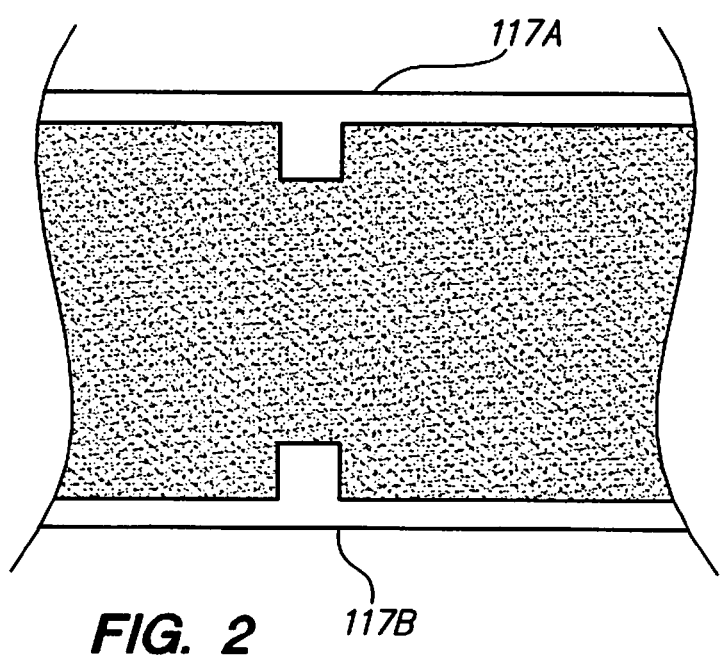
FIG. 2 is a cross-section on line 2-2 of the flow plate in FIG. 1.

In a second example of this embodiment, the apparatus is comprises separate first and second selection plates comprising respective first and second selection plate surfaces and respective first and second selection plate peripheral members; separate first and second planar separation membranes having respective first and second membrane peripheral members; separate first and second flow channels; separate first and second selection channels; and a single flow plate which comprises (a) separate first and second flow plate chambers, (b) separate first and second flow plate surfaces on opposite sides of the single flow plate, and (c) first and second flow plate peripheral members which (i) respectively surround the first and second flow plate chambers, and (ii) respectively extend away from the first and second flow plate surfaces; the first flow plate peripheral member and the first selection plate peripheral member being secured to each other, and the first membrane peripheral member (i) being sandwiched between the first flow plate peripheral member and the first selection plate peripheral member and (ii) directly contacting each of the first flow plate peripheral member and the first selection plate peripheral member, and the second flow plate peripheral member and the second selection plate peripheral member being secured to each other, and the second membrane peripheral member (i) being sandwiched between the second flow plate peripheral member and the second selection plate peripheral member and (ii) directly contacting each of the second flow plate peripheral member and the second selection plate peripheral member;

The apparatus comprising structural features which enable liquid to flow through each of the flow channels when no vacuum is exerted on the membranes, for example a first channel in the first flow plate surface and a second channel in the second flow plate surface, as shown, for example in FIG. 2. In such apparatus, in use, the liquid to be degassed first passes through the first flow channel, from the inlet to the outlet, then passes from the outlet of the first flow channel into the second flow channel, then passes through the second flow channel to an outlet from the second flow channel.

In this second example, the various first and second components can be the same or different. For example the first and second flow channels can have the same or different dimensions, and/or the first and second selection channels can have the same or different dimensions; and/or the first and second membranes can be the same or different dimensions. Preferably, the first and second flow channels have the same dimensions, and the first and second selection channels have the same dimensions. In this way, in particular by selecting suitable first and second membranes, different results can be achieved using apparatus which is the same except for the use of different separation membranes. In a variation of this apparatus, one of the membranes is a separation membrane and the other membrane is a membrane which is substantially impermeable both to the liquid and to the selected gas. From a manufacturing viewpoint, it is very convenient to be able to make a single device whose performance can be changed merely by changing the membranes, including (a) the use of a first separation membrane which is effective in degassing the liquid and a second membrane which does not degas or otherwise effect the liquid, and (b) the use of a first separation membrane which removes one gas and a second separation membrane which removes another gas.

A second embodiment of the first preferred aspect of the invention is apparatus which contains two selection channels and two membranes, and a single flow channel having at least part of each major wall provided by one of said membranes. Thus, in this second embodiment, the apparatus comprises (1) a flow plate which comprises (a) a flow plate chamber and (b) a flow plate peripheral member which surrounds the flow plate chamber;
(2) a first selection plate comprising
  (a) a first inner selection plate surface which comprises (i) a first selection plate base and (ii) first selection plate elements which extend from the first base, are separated by intercommunicating selection areas, and have outer surfaces remote from the first base; and
  (b) a first selection plate peripheral member which (i) surrounds the first inner selection plate surface and (ii) extends away from the first base;
(3) a first planar separation membrane which (a) comprises (i) a first membrane transmission section having a first major surface and a second major surface, and (ii) a first membrane peripheral member which surrounds the first membrane transmission section, and (b) lies between the flow plate chamber and the first selection plate;
(4) a second selection plate comprising
  (a) a second inner selection plate surface which comprises (i) a second selection plate base and (ii) second selection plate elements which extend from the second base, are separated by intercommunicating selection areas, and have outer surfaces remote from the second base; and
  (b) a second selection plate peripheral member which (i) surrounds the second inner selection plate surface and (ii) extends away from the second base;
(5) a second planar separation membrane which (a) comprises (i) a second membrane transmission section having a first major surface and a second major surface, and (ii) a second membrane peripheral member which surrounds the second membrane transmission section, and (b) lies between the flow plate chamber and the second selection plate;
(6) a flow channel which (a) comprises the flow plate chamber, and (b) is at least in part bounded by the first major surface of the first membrane transmission section, the first major surface of the second membrane transmission section, and the flow plate peripheral member;
(7) an inlet for liquid to enter the flow channel;
(8) an outlet for liquid to leave the flow channel;
(9) a first selection channel which is at least in part bounded by (a) the second major surface of the first membrane transmission section, (b) the first selection plate base, and (c) the first selection plate elements;
(10) a second selection channel which is at least in part bounded by (a) the second major surface of the second membrane transmission section, (b) the second selection plate base, and (c) the second selection plate elements;
(11) at least one first selection plate port for maintaining a selection fluid in the first selection channel; and
(12) at least one second selection plate port for maintaining a selection fluid in the second selection channel;

the first flow plate peripheral member and the first selection plate peripheral member being sealed to each other.

The first flow plate peripheral member of the first selection plate peripheral member can for example be sealed to each other by sandwiching the first membrane peripheral member between the first flow plate peripheral member and the first selection plate peripheral member so that it directly contacts each of the first flow plate peripheral member and the first selection plate peripheral member; and the second flow plate peripheral member and the second selection plate peripheral member being can for example be sealed to each other by sandwiching the second membrane peripheral member between the second flow plate peripheral member and the second selection plate peripheral member said that it directly contacts each of the second flow plate peripheral member and the second selection plate peripheral member. Alternatively, one or both of the pairs of peripheral members can be sealed to each other in some of the way, for example by making use of a comprising an O-ring.

The various first and second components in this second embodiment are can be the same or different.

The apparatus and method of the first and second aspects of the invention are particularly useful for processing a liquid, for example an HPLC eluent, an analytical sample or an inkjet fluid, the selection fluid being a gas, for example air, under reduced pressure, which is frequently referred to in this specification simply as "a vacuum." They are also very useful for degassing jet fuels.

It is usually preferable for the flow plate(s) and the selection plate(s) to have strictly planar configurations, though the invention includes the possibility that one or more of them is not strictly planar. Preferred apparatus has one or more of the following features:

(1) the flow plate chamber lies substantially in a plane, and is preferably a rectangular parallelepiped whose depth is substantially less than its width and its length;
(2) the flow plate peripheral member has an outer surface which lies in a plane;
(3) the flow plate peripheral member lies substantially in a plane having a depth substantially equal to the depth of the flow plate chamber;
(4) when the flow plate has an inner flow plate surface, the inner flow plate surface lies substantially in a plane;
(5) the selection plate base lies substantially in a plane;
(6) the outer surfaces of the selection plate elements which extend from the base lie substantially in a plane;
(7) the selection plate peripheral member has an outer surface which lies substantially in a plane, and preferably the outer surfaces of the selection plate elements which extend from the base lie in the same plane; and
(8) the intercommunicating selection areas of the selection plate lie substantially in a plane.

Particularly preferred apparatus has all of these features, with the various planes being parallel to each other.

The plan shape of the flow plate(s) and the selection plate (s), i.e. their shape when viewed in plan, can be any shape. However, it is generally convenient for them to have a generally rectangular (including square) plan shape and for all the flow plate(s) and the selection plate(s) to have substantially the same plan shape. Generally, the length dimension (i.e. the dimension in the direction in which the liquid flows) of the rectangular shape is greater than, e.g. 1.1-2.0 times, the width dimension.

The various aspects of the invention can make use of one or more of the following optional features.

(1) The passageway joining the inlet and the outlet(s) has a cross-sectional area of 0.0005-0.0008 in.$^2$, for example 0.006-0.007 in.$^2$.
(2) The passageway joining the inlet and the outlet(s) has a width (measured at its widest point if the width is not uniform) of 0.02-0.03 inch, e.g. about 0.025 inch, and a height (measured at its maximum height if the height is not uniform) of 0.02-0.03 inch, e.g. about 0.025 inch.
(3) The passageway has a uniform cross-section throughout its length.
(4) The cross-section of the passageway is generally rectangular (including square) or generally U-shaped, preferably a flat bottomed U.
(5) The flow channel has an aspect ratio (width to height) of at least 25:1, preferably at least 250:1, up to for example 3,000:1, with values of 100:1-500:1, e.g. 200:1-400:1, often being preferred. The flow channel has a height of 0.00025-0.01, e.g. 0.0025-0.0055 or 0.0035-0.005, inch, and preferably a width of 0.5 to 5, e.g. 1-2, inch.
(6) The flow channel has a length of 1.5-4.0, e.g. 2.5-4.0, inch (38-102 mm, e.g. 63-102 mm).
(7) The flow plate has two open channels on opposite sides of the plate. The two channels can be directly opposite to each other over part or all of their lengths, or can follow completely different paths.
(8) The channel is produced by molding at the same time as the rest of the flow plate is produced by molding.
(9) The channel is produced by machining a flow plate which has been produced by molding.

Other optional features of the apparatus and method of the invention include the following.

(1) The dead volume of the apparatus is low, for example, in some embodiments, less than 600 μL, preferably less than 550 μL.
(2) The pressure in the flow channel, when the vacuum is on, is up to 150, e.g. 10-100, psi (up to 10.5, e.g. 7-70, kilograms per square centimeter), or as much 125-150 psi (8.75-kilograms per square centimeter) above ambient atmospheric pressure.
(3) The membrane has a permeability to oxygen of at least 25,000 centiBarrer, preferably at least 60,000 centiBarrer.
(4) The membrane is composed of Teflon AF 2400 or another copolymer of tetrafluoroethylene and a perfluoro-1.3-dioxole, e.g. Hyflon AD.
(5) The membrane is composed of a copolymer of a perfluoro-1,3-dioxole and a perfluoro monomer other than tetrafluoroethylene.
(6) The membrane is less than 2.5 mil (63μ) thick, preferably less than 2.0 mil (51μ) thick, for example is 10-45μ thick.
(7) The flow plate is a single monolithic article, e.g. a molded article in which the molding includes a channel in the base of the flow plate or a molded article in which a channel has been created in the base of the flow plate by mechanical means.
(8) The selection plate is a single monolithic article, e.g. a molded article.
(9) The flow plate and the selection plate are composed of the same material, the material being one which is inert to the gas-containing liquid, for example a polymeric material, e.g. a polyether ether ketone (e.g. PEEK), or a metal, e.g. aluminum or steel. This reduces or removes the danger that, if the temperature changes, e.g. when aviation fluids are being processed, the components will shrink or expand at different rates, resulting in leakage because the seals between the components are compromised.
(10) The selection plate port is connected to a vacuum so that the pressure on the selection areas of the membrane is 20-30, e.g. 26-28, inchHg, (67.5-102, e.g. 88-95, centibar) or at least 28.5 inch water (7.1 centibar).
(11) The apparatus comprises two or more selection plate ports.
(12) The selection channel comprises an inlet port through which a selection gas can be supplied, the selection gas comprising one or more selected gaseous ingredients which are chosen to control the amounts of those ingredients which are removed from or added to the liquid passing through the flow channel.
(13) In the selection plate, the ratio of the total area of the selection plate elements to the total area of the selection areas is from 25 to 75, e.g. 40 to 60.
(14) The selection areas have a width of 0.01 to 0.03 inch, e.g. 0.015 to 0.025 inch (0.25-0.75, e.g. 0.4-0.64 mm).
(15) The height of the selection plate elements is 0.001-0.05, e.g. 0.01-0.02, inch (0.025-1.25, e.g. 0.25-0.51, mm).
(16) The selection plate elements, which can be arranged in any way which results in selection areas which communicate with the selection port, are rectangular (including square) or round islands, for example square islands arranged in straight rows at right angles to each other. In other exemplary embodiments, the selection plate elements are selected from concentric circles, spirals, crosses and squares within squares, all interrupted by selection areas which communicate with the selection port.

(17) The selection plate elements are shaped so that, when a selection membrane is drawn up against the selection plate elements by a vacuum on the selection areas, the surfaces of the selection plate elements which are contacted by the selection membrane are free from abrupt changes. In one example, at least one cross-section through the selection plate element, and, when the selection plate element is an island, preferably both the cross-sections through the selection plate element which are at right angles to each other, comprise two edge faces each of which is substantially perpendicular to the selection plate base and an outer face which is substantially parallel to the selection plate base, and the outer face is connected to each of the edge faces by a curved line, for example a quarter of a circle or of an ellipse. In another example, the selection plate is corrugated so that the outer surfaces of the corrugations provide the selection plate elements and the inner surfaces of the corrugations provide the intercommunicating selection areas. The corrugations can be regular or irregular. For example, the selection plate elements can be provided by relatively narrow corrugations and the selection areas by relatively wide corrugations, or vice versa.

(18) At least one of the flow plate peripheral member and the selection plate peripheral member, which are secured to each other, with the membrane peripheral member sandwiched between them, has an upstanding irregularity which is slightly higher than, for example 0.00025-0.010 inch (0.006-0.25 mm) higher than, e.g. 0.001-0.0045 inch (0.025-0.12 mm) higher than, the face of the peripheral member.

The presence of such an upstanding irregularity improves the quality of the seal which is provided by the separation membrane between the peripheral members. The upstanding irregularity is preferably a continuous feature around the entire peripheral member. There can be two upstanding irregularities, which can be the same or different, preferably parallel to each other, on one of the peripheral members. The face of the second, opposite peripheral member can be free of irregularities, or can comprise an upstanding irregularity, or can comprise a depression which cooperates with an upstanding irregularity on the face of the first peripheral member. When the flow plate and the selection plate are joined together by rivets or other fastening devices which pass through holes in the peripheral members, preferably at least one upstanding irregularity is inside the fastening devices, and there may be a second upstanding irregularity outside the fastening devices. The irregularity may for example have a cross-section which is pointed, square, part-round or chamfered or two or more of these. The irregularity may be narrow enough to convert substantially all the forces exerted on the faces onto a relatively small area. The membrane undergoes deformation (which may be plastic or elastic deformation) in the area of the upstanding feature. A seal formed in this manner is sometimes referred to as a knife edge seal.

(19) The apparatus is free of compression seals other than the seal(s) involving the separation membrane

(20) The membrane includes location features, e.g. peripheral cut-outs, which cooperate with corresponding features on the flow plate and/or the selection plate so that the membrane is correctly located. Particular examples of such location features are disclosed above

(21) The pressure drop between the inlet and the outlet of the flow chamber, which is to some extent dependent on the rate of flow, is less than 0.1 psi, e.g. less than 0.06 psi or less than 0.04 psi (0.0028 kg/square centimeter). When degassing aircraft fuel, the pressure drop will be greater.

(22) The flow plate peripheral member(s) and the selection plate peripheral member(s) are secured together by means of rivets which pass through holes in the peripheral members. The rivets should be applied in a way such that the stresses are evenly distributed over the periphery of the apparatus. We have found that an effective seal can be achieved with rivets and that rivets can be conveniently used in manufacturing processes. Any other effective method of securing the peripheral members together can be used, including, but not limited to, securing devices which pass through holes in the peripheral members.

(23) When the components of the apparatus are being assembled, positioning of the membrane is assisted by placing the membrane adjacent to the selection plate while drawing a vacuum on the open areas of the support. The vacuum can be supplied through the selection plate port.

Referring now to FIG. 1, the following reference numerals are used to indicate different components of the flow plate.
  11 flow plate.
  111 flow plate peripheral member
  1111 upstanding irregularity on the flow plate peripheral member.
  112 flow plate channel
  113 inner flow plate surface
  114 inlet to flow channel
  115A, 115B, 115C outlet from flow channel
  117 open channel in the inner flow plate surface
  118 rivet holes.

FIG. 2 is a cross-section on line 2-2 of FIG. 1, and shows two open channels 117A and 117B on opposite sides of the flow plate (the only one of the channels being visible in FIG. 1). The channels were produced in the same molding operation as the remainder of the flow plate.

Figure 3:
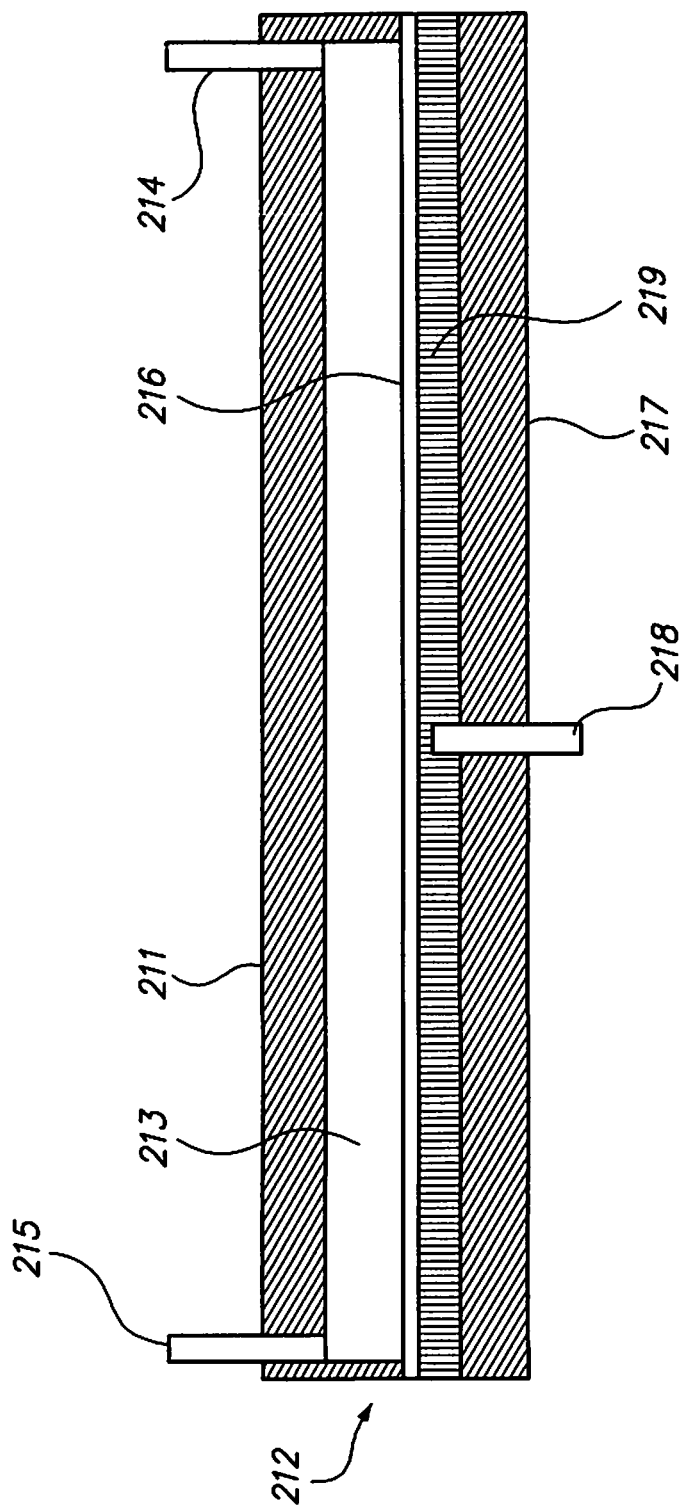
FIG. 3 is a cross-section view of an alternative embodiment.

Referring now to FIG. 3, this shows
(1) a flow plate, 211, which comprises (a) a flow plate chamber, 213, (b) an inner flow plate surface, 216 and (c) a flow plate peripheral member, 212, which (i) surrounds the flow plate chamber, and (ii) extends away from the inner flow plate surface,
(2) a selection plate comprising
  (a) an inner selection plate surface which comprises (i) a selection plate base, 217, and (ii) a membrane support sheet 219, and
  (b) a selection plate peripheral member which surrounds the inner selection plate surface and extends away from the selection plate base,
(3) a plane separation membrane which (a) comprises (i) a membrane transmission section, 216, having a first major surface and a second major surface, and (ii) a membrane peripheral member which surrounds the membrane transmission section, and (b) is at least in part bounded by the first major surface of the membrane transmission section, the flow plate peripheral member and the inner flow plate surface;
(4) a flow channel which (a) comprises the flow plate chamber, 213, and (b) is at least in part bounded by the first major surface of membrane transmission section, the flow plate peripheral member and the inner flow plate surface;
(5) an inlet for liquid to enter the flow channel, 214;
(6) an outlet for liquid to leave the flow channel, 215;

(7) a selection channel which is at least in part bounded by the second major surface of the membrane transmission section, the selection plate base, and the porous membrane support sheet; and (8) a selection plate port, 218, for maintaining a selection fluid in the selection channel the flow plate peripheral member and the selection plate peripheral member being secured to each other, and the membrane peripheral member (a) being sandwiched between the flow plate peripheral member and the selection plate peripheral member and (b) directly contacting each of the flow plate peripheral member and the selection plate peripheral member;

the apparatus comprising structural features which enable liquid to flow through the flow channel when no vacuum is exerted on the membrane.

The invention claimed is:

1. A planar degasser comprising
   (1) a flow plate which comprises a flow plate chamber having a base, an inlet and an outlet,
   (2) a planar separation membrane comprising a membrane transmission section which has a first major surface and a second major surface, the first major surface of the membrane transmission section being adjacent to the base of the flow plate chamber and
   (3) a supporting member which is adjacent to the second major surface of the membrane transmission section;
   the separation membrane
   (A) when the pressure on the first major surface is greater than the pressure on the second major surface, (1) contacting and being supported by the supporting member and (2) forming, with the base of the flow plate chamber, a flow channel through which a liquid to be degassed can be passed from the inlet of the flow plate chamber to the outlet of the flow plate chamber; and
   (B) when the pressure on the first major surface is less than the pressure on the second major surface (1), being separate from the supporting member and
   (2) contacting the base of the flow plate chamber;
   the degasser comprising at least one structural feature which, when the pressure on the first major surface is equal to or less than the pressure on the second major surface, enables a liquid to flow from the inlet of the flow plate chamber to the outlet of the flow plate chamber, the structural feature being selected from
   (i) the base of the flow plate chamber comprises an open channel which connects the inlet of the flow plate chamber to the outlet of the flow plate chamber, and which enables liquid to flow from the inlet to the outlet when the pressure on the first major surface of the separation membrane is less than the pressure on the second major surface of the membrane and the separation membrane contacts the base of the flow plate chamber,
   (ii) the base of the flow plate chamber comprises upstanding elements which prevent the membrane from contacting the whole surface of the base of the flow plate chamber, thus enabling liquid to flow from the inlet to the outlet when the pressure on the first major surface is less than the pressure on the second major surface and the separation membrane contacts the base of the flow plate chamber, and
   (iii) the degasser comprises (1) a passageway which connects the inlet of the flow plate chamber to the outlet of the flow plate chamber and (2) a valve which (a) is controlled by the pressure on the separation membrane and (b) closes the passageway when the pressure on the first major surface is greater than the pressure on the second major surface and opens the passageway when the pressure on the first major surface passageway is less than the pressure on the second major surface, thus enabling liquid to flow from the inlet to the outlet when the pressure on the first major surface is less than the pressure on the second major surface and the separation membrane contacts the base of the flow plate chamber.

2. A degasser according to claim 1 wherein the supporting member is a selection plate comprising an inner selection plate surface which comprises (i) a selection plate base, and (ii) selection plate elements which extend from the base, are separated by intercommunicating selection areas, and have outer surfaces remote from the selection plate base.

3. A degasser according to claim 1 wherein the supporting member is composed of one or more materials selected from the group consisting of porous polymeric materials and porous metal sheets.

4. A planar degasser which comprises
   (1) a flow plate which comprises a flow plate chamber having a base, an inlet and an outlet,
   (2) a planar separation membrane comprising a membrane transmission section which has a first major surface and a second major surface, the first major surface of the membrane transmission section being adjacent to the base of the flow plate chamber and
   (3) a supporting member which is adjacent to the second major surface of the membrane transmission section,
   the separation membrane
   (A) when the pressure on the first major surface is greater than the pressure on the second major surface, (1) contacting and being supported by the supporting member and (2) forming, with the base of the flow plate chamber, a flow channel through which a liquid to be degassed can be passed from the inlet of the flow plate chamber to the outlet of the flow plate chamber; and
   (B) when the pressure on the first major surface is less than the pressure on the second major surface (1), being separate from the supporting member and
   (2) contacting the base of the flow plate chamber;
   wherein the base of the flow plate chamber comprises an open channel which connects the inlet of the flow plate chamber to the outlet of the flow plate chamber, and which enables liquid to flow from the inlet to the outlet when the pressure on the first major surface of the separation membrane is less than the pressure on the second major surface of the membrane and the separation membrane contacts the base of the flow plate chamber.

5. A degasser according to claim 4 wherein the flow plate chamber comprises two or more outlets, and the open channel connects the inlet to at least two of the outlets.

6. A method which comprises
   (1) passing a first liquid to be degassed through the flow channel of a planar degasser as claimed in claim 1 while the pressure on the first major surface of the separation membrane is greater than the pressure on the second major surface of the separation membrane, and
   (2) after step (1), reducing the pressure on the second major surface of the separation membrane so that it is less than the pressure on the second major surface and the separation membrane contacts the base of the flow plate chamber, and passing a second liquid through the open channel in the base of the flow plate chamber.

7. A method according to claim 6 which comprises
   (3) after step (2), increasing the pressure on the first major surface of the separation membrane so that it is greater than the pressure on the second major surface of the separation membrane, and passing a third liquid through the flow channel.

8. A planar degasser according to claim 1 wherein the base of the flow plate chamber, when viewed in plan, is generally rectangular and has a length and a width, with the length dimension being 1.1-2.0 times the width dimension.

9. A planar degasser according to claim 1 wherein the flow channel formed by the separation membrane and the base of the flow plate chamber, when the pressure on the first major surface of the separation membrane is greater than the pressure on the second major surface of the separation membrane, is in the shape of a rectangular parallelepiped whose depth is substantially less than its width and its length.

10. A planar degasser according to claim 1 wherein the flow channel formed by the separation membrane and the base of the flow plate chamber, when the pressure on the first major surface of the separation membrane is greater than the pressure on the second major surface of the separation membrane, has a height of 0.0025 to 0.0055 inch and a width of 1 to 2 inch.

11. A planar degasser according to claim 1 wherein the membrane is composed of a polymeric material and is less than 51μ thick.

12. A planar degasser according to claim 4 wherein the open channel which connects the inlet of the flow plate chamber to the outlet of the flow plate chamber is 0.02-0.03 inch wide and 0.02-0.03 inch high.

13. A planar degasser according to claim 4 which comprises
   (1) a single said flow plate having first and second flow plate chambers on opposite sides of the flow plate, a first inlet and a first outlet communicating with the base of the first flow plate chamber, and a second inlet and a second outlet communicating with the base of the second flow plate chamber;
   (2) two said planar separation membranes
   (3) two said supporting members each of which is adjacent to one of the planar separation membranes;
each of the separation membranes
   (A) when the pressure on the first major surface is greater than the pressure on the second major surface, (1) contacting and being supported by the adjacent supporting member and (2) forming, with the base of one of the flow plate chambers, a flow channel through which a liquid to be degassed can be passed from the inlet of the flow plate chamber to the outlet of the flow plate chamber; and
   (B) when the pressure on the first major surface is less than the pressure on the second major surface (1), being separate from the supporting member and
   (2) contacting the base of the flow plate chamber;
wherein the base of the first flow plate chamber comprises a first open channel which connects the inlet of the first flow plate chamber to the outlet of the first flow plate chamber, and which enables liquid to flow from the inlet of the first flow plate chamber to the outlet of the first flow plate chamber when the pressure on the first major surface of the separation membrane is less than the pressure on the second major surface of the membrane, and
the base of the second flow plate chamber comprises a second open channel which connects the inlet of the second flow plate chamber to the outlet of the second flow plate chamber, and which enables liquid to flow from the inlet of the second flow plate chamber to the outlet of the second flow chamber when the pressure on the first major surface of the separation membrane is less than the pressure on the second major surface of the membrane.

14. A planar degasser according to claim 4 wherein the base of the flow plate chamber, when viewed in plan, is generally rectangular and has a length and a width, with the length dimension being 1.1-2.0 times the width dimension.

15. A planar degasser according to claim 14, wherein the flow channel formed by the separation membrane and the base of the flow plate chamber, when the pressure on the first major surface of the separation membrane is greater than the pressure on the second major surface of the separation membrane, is in the shape of a rectangular parallelepiped whose depth is substantially less than its width and its length.

16. A planar degasser according to claim 4 wherein the flow channel formed by the separation membrane and the base of the flow plate chamber, when the pressure on the first major surface of the separation membrane is greater than the pressure on the second major surface of the separation membrane, has a height of 0.0025 to 0.0055 inch and a width of 1 to 2 inch.

17. A planar degasser comprising
   (1) a flow plate which comprises a flow plate chamber having a base, an inlet and an outlet,
   (2) a planar separation membrane comprising a membrane transmission section which has a first major surface and a second major surface, the first major surface of the membrane transmission section being adjacent to the base of the flow plate chamber and
   (3) a supporting member which is adjacent to-the second major surface of the membrane transmission section;
the separation membrane
   (A) when the pressure on the first major surface is greater than the pressure on the second major surface, (1) contacting and being supported by the supporting member and (2) forming, with the base of the flow plate chamber, a flow channel through which a liquid to be degassed can be passed from the inlet of the flow plate chamber to the outlet of the flow plate chamber; and
   (B) when the pressure on the first major surface is less than the pressure on the second major surface (1), being separate from the supporting member and
   (2) contacting the base of the flow plate chamber;
the degasser comprising (1) a passageway which connects the inlet of the flow plate chamber to the outlet of the flow plate chamber and (2) a valve which (a) is controlled by the pressure on the separation membrane and (b) closes the passageway when the pressure on the first major surface is greater than the pressure on the second major surface and opens the passageway when the pressure on the first major surface passageway is less than the pressure on the second major surface, thus enabling liquid to flow from the inlet to the outlet when the pressure on the first major surface is less than the pressure on the second major surface and the separation membrane contacts the base of the flow plate chamber.

* * * * *